US005636564A

United States Patent [19]
Weiss

[11] Patent Number: 5,636,564
[45] Date of Patent: Jun. 10, 1997

[54] WAFFLE MAKER WITH THERMAL CONTROLLER

[75] Inventor: Ronald R. Weiss, Okeana, Ohio

[73] Assignee: Gold Medal Products Co.

[21] Appl. No.: 524,339

[22] Filed: Sep. 6, 1995

[51] Int. Cl.$^6$ .................................................. A47J 37/00
[52] U.S. Cl. ........................... 99/332; 99/372; 99/378; 99/380; 219/524; 219/441
[58] Field of Search ................................ 99/337, 332, 372, 99/380, 378, 379; 219/524, 441, 442, 250, 251, 252

[56] References Cited

U.S. PATENT DOCUMENTS

| | | | |
|---|---|---|---|
| 3,788,302 | 1/1974 | Malaney et al. | 99/330 |
| 3,999,473 | 12/1976 | Carbon | 99/377 |
| 4,682,012 | 7/1987 | Wolf et al. | 99/332 |
| 4,817,510 | 4/1989 | Kowalics et al. | 99/331 |
| 4,913,038 | 4/1990 | Burkett et al. | 99/331 |

*Primary Examiner*—Reginald Alexander
*Attorney, Agent, or Firm*—Wood, Herron & Evans

[57] ABSTRACT

For making a cooked waffle from batter, a waffle maker comprises a pair of opposing heater grids configured to be closed together when batter is placed therebetween for cooking, and a controllable power supply with an output coupled to the grids for supplying power thereto to heat the grids. The power supply has a cooking mode wherein a high level output is supplied to the grids during a cooking cycle and a standby mode wherein a lower level output is supplied to the grids upon completion of the cooking cycle for preventing overheating of the grids. The temperature of the grids is controlled to provide optimum cooking and to prevent overheated grids between cooking cycles.

20 Claims, 3 Drawing Sheets

WAFFLE MAKER WITH THERMAL CONTROLLER

FIELD OF THE INVENTION

This invention relates generally to waffle makers and particularly to waffle makers and associated cooking controls and methods.

BACKGROUND OF THE INVENTION

Waffle makers or waffle irons are generally known for making a variety of waffle products, including Belgian waffles and large ice cream cones. Waffle makers generally comprise two opposing, hinged heater grids which are formed in the shape of the desired waffle pattern. Uncooked waffle batter is poured onto one grid and the second grid is moved down to contact the first grid with the batter held therebetween. The heater grids cook the batter to form a fluffy waffle. Once the waffle is cooked for a predetermined time or cooking cycle, it is removed to be consumed and fresh batter is poured between the heater grids to make another waffle. When making waffles, such as in restaurants, there is often a delay between cooking cycles, because the demand for waffles will generally not be constant during any given time period. Nevertheless, the cooker must be kept up to cooking temperature so it is ready to cook more waffles without having to wait until the cooker is again brought up to cooking temperature. This demands that enough power be cycled to the grids so the set grid temperature to be maintained in the actual cooking is constantly maintained. This temperature is thus set high as if the batter was on the grids. When no batter is present, such as between cycles, the same power applied so the grids, as in cooking, overheats the grids beyond these desirable cooking temperatures. While a thermostat is typically used to keep the grid temperature in a certain range, multiple cycles cause the thermostat to wear out quickly, requiring too frequent repair. As well, use of a thermostat cycles enough cooking power to heat the grids with batter present; when it is not, the grid temperature is still unduly and undesirably elevated since the extra heat sink provided by the batter is not present.

Stated in another way, assuming batter is poured onto the grid when the thermostat has just opened the grid power, the grid cools to the lower thermostat temperature, then the thermostat closes power to the grid and its temperature elevates toward the upper thermostat temperature for cooking. Such upper setting is acceptable for cooking but is too high and overheats the grids when no batter is being cooked. A typical operation is more specifically described below.

More particularly, to properly cook the waffle in a short amount of time, the heater grids are each heated to over 400° F. To attain and maintain such heat, up to 1000 Watts of power (500 Watts per grid) is delivered to the heater grids constantly during the ON cycle of the thermostat. As noted above, it is desirable to leave the heater grids ON and at the proper cooking temperature at all times, even between cooking cycles, so that they are always ready to instantly make a waffle. In that way, the delay associated with having to heat the grids from room temperature to the proper cooking temperature is avoided each time that a waffle must be made. When a conventional waffle maker is ON, the same power level is supplied to the heater grids to maintain the cooking temperature whether or not a waffle is being cooked. This does not present a problem when there is batter between the heater grids to "load" the grids and absorb the heat. However, when the cooking cycle is complete and the waffle is finished, the continuation of constant power delivered to the heater grids tends to overheat the grids. In other words, since there is no heat sink, as represented by the batter, the grid temperature simply, and undesirably, elevates beyond what would be a desirable cooking temperature.

To prevent too much overheating and damage to the waffle maker between cooking cycles, conventional waffle makers utilize thermostat switches which operate to cyclically interrupt the power to the grids to maintain the heater grids at the desired temperature when a waffle is not being cooked. Such thermostat switches may have an operating range of ±15° F. and thus will constantly cycle to periodically interrupt the power to the heater grids. Thermostat switches, however, have a limited life of around 100,000 cycles, which gives a normally used waffle maker a useful life of approximately four months before the thermostat switches must be replaced. Furthermore, the available thermostat-controlled waffle makers are very susceptible to the temperature of the environment in which they are operated. For example, a cooler environment or ambient temperature will cause the waffle maker thermostat switch to cycle more frequently, thus further limiting its useful life. Additionally, if cold refrigerated batter is utilized, the temperature control for the heater grid is usually set slightly higher for proper cooking. This further increases thermostat cycling and decreases the useful life of the waffle maker between thermostat replacements.

As may be appreciated, constant thermostat replacement is not desirable economically or from a practical standpoint. As also noted above, it is undesirable to constantly turn the waffle maker ON and OFF between uses, because the heater grids require a predetermined amount of time, often up to 20 minutes, to preheat to their operating temperature. This increases the delay that is necessary to cook a waffle.

Accordingly, it is an objective of the present invention to increase the useful life of a waffle maker between necessary maintenance periods.

It is a further objective of the present invention to provide a waffle maker which does not overheat and is less susceptible to being affected by the temperature of the environment and environmental fluctuations.

It is a further objective to rapidly and sufficiently cook waffle batter to make a waffle without waiting for the waffle cooker heater grids to preheat to the operating temperature each time that a waffle is made.

It is still a further objective to rapidly and sufficiently cook a waffle regardless of whether the batter is at room temperature or is refrigerated.

SUMMARY OF THE INVENTION

The present invention addresses the above objectives and provides a waffle maker comprising a pair of opposing heater grids and a controllable power supply with an output coupled to the grids for selectively supplying power thereto during a cooking cycle and between cooking cycles as a function of both at rest and cooking demands. The power supply maintains the heater grids at a desired cooking temperature between cooking cycles while preventing overheating by reducing the amount of power delivered to the grids between cooking cycles. However, during a cooking cycle, a higher level of power is delivered to the grids to sufficiently cook a waffle. In other words, the invention contemplates a power supply which recognizes circumstances of the cooker to render its operation more efficient. When no batter is applied to the grids, reduced power is applied to keep the grids at a cooking temperature and not above such temperature. When batter is applied, power is increased to maintain such temperature at the desired cooking level despite the batter operating as a heat sink. Thus the invention contemplates controlling a waffle cooker by controlling applied power as a result of the status of the cooker, as opposed to simply cycling power ON and OFF as a function of selected temperature set points. Power is increased when batter is added, and power is reduced during non-cook times so as not to heat the grids beyond optimum cook temperatures.

The controllable power supply comprises a voltage control unit coupled to the heater grids for supplying an output voltage thereto and a control resistor connected in parallel with the output of the voltage control unit for setting the level of the output voltage supplied to the grids. More specifically, the voltage control unit includes a proportional phase controller having an output voltage level which is a function of a parallel resistance applied to the output of the phase controller. The control resistor is variable and is used to provide the parallel resistance and thus set the output voltage level. The controllable power supply further includes a timer circuit with a timer-controlled relay switch connected in parallel with the control resistor.

During a cooking cycle the power supply is in a cooking mode, and the timer circuit closes the timer-controlled relay switch, thus short circuiting the control resistor so that a high output voltage is delivered to the heater grids to cook the batter. When the timer circuit times out at the end of the preselected cooking cycle, the relay switch is opened and the control resistor is brought back into the output circuit of the voltage control unit to decrease the output to a lower voltage level in between cooking cycles when there is no batter between the grids. During this standby mode, the grids are sufficiently maintained in a heated condition at a temperature close to the cooking temperature but are supplied with less power to prevent overheating of the unused grids. As noted, such overheating would occur if enough power is supplied to the non-cooking grids as is necessary to elevate them to cooking temperature when batter is present.

In a preferred embodiment of the invention, the timer circuit has three timer-controlled relay switches which are operated by a timer. A momentary START switch of the waffle maker is closed and momentarily energizes the timer which in turn closes the first timer-controlled relay switch to latch the timer to an ON state and thus initiate the cooking cycle. The START switch is activated when batter has been placed between the heater grids and the grids are seated together to cook a waffle. At the initiation of the cooking cycle, the timer also controls a second timer-controlled relay switch to close the relay switch and thus short circuit the control resistor at the output of the voltage control unit. The voltage control unit then delivers a full 120 Volts AC to each of the heater grids at a rate of preferably 500 Watts per grid.

The timer controls the operation of the second timer-controlled relay switch and thus the cook time of the waffle. A variable resistor controls the timer operation and is coupled to a timer knob on the waffle maker to allow an operator to set the length of the cooking cycle between 2 and 5 minutes. When the cooking cycle is complete, the second timer-controlled relay switch is opened and the control resistor is again effective at the output of the voltage control unit. The control resistor reduces the output voltage to approximately 32–35 Volts AC to reduce the power to the grids (<500 Watts per grid) and prevent overheating of the heater grids when batter is not being cooked. The lower amount of power delivered to the grids maintains them in a hot and standby mode and ready for cooking the next waffle without allowing them to overheat.

Upon opening the second timer-controlled relay switch after the cooking cycle is complete, a third timer-controlled relay switch is closed to apply a continuous signal to an audible alarm, such as a piezoelectric buzzer. A momentary STOP switch is coupled to the timer and, when activated, the STOP switch momentarily opens to deactivate the timer and alarm buzzer and to reset all of the timer-controlled relay switches to an open state. This removes power to the timer, removes power to the buzzer, and provides a reduced power level at the output of the voltage control unit. Pouring batter between the grids and activating the START button will again cook a waffle quickly and properly without requiring a lengthy preheat delay.

A high limit thermostat switch between the output of the voltage control unit and the heater grids ensures that an excessive temperature is never exceeded. The high limit thermostat switch generally remains closed and only operates when a malfunction of the invention occurs, such as if the timer-controlled relay switch which short circuits the control resistor sticks closed.

During the cooking cycle, the waffle batter keeps the heater grids from getting too hot during the duration of the cooking cycle. During the standby mode, between cooking cycles, the controllable power supply of the invention maintains the heater grid in a heated state while preventing them from overheating. The temperature control of the heater grid is generally not susceptible to the environment in which the waffle maker is placed. Furthermore, the waffle maker will readily cook batter which is refrigerated or at room temperature by an adjustment of the cooking cycle duration without being prone to overheating.

In the preferred embodiment of the invention, the controllable power supply output delivers 120 Volts AC in the cooking mode to cook a waffle at a temperature between approximately 400° F. and 410° F. In the standby mode, the power supply provides 32–35 Volts AC at the output to maintain the temperature of the grids between 360° F. and 410° F., and preferably between 402° F. and 410° F. However, as will be readily understood by a person of ordinary skill in the art, the output of the power supply during the cooking mode and the standby mode may need to be adjusted depending upon the mass and heat dissipating characteristics of the heater grids.

The above-discussed advantages and other advantages of the present invention shall be made apparent from the accompanying drawings and the following description of the preferred embodiment thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
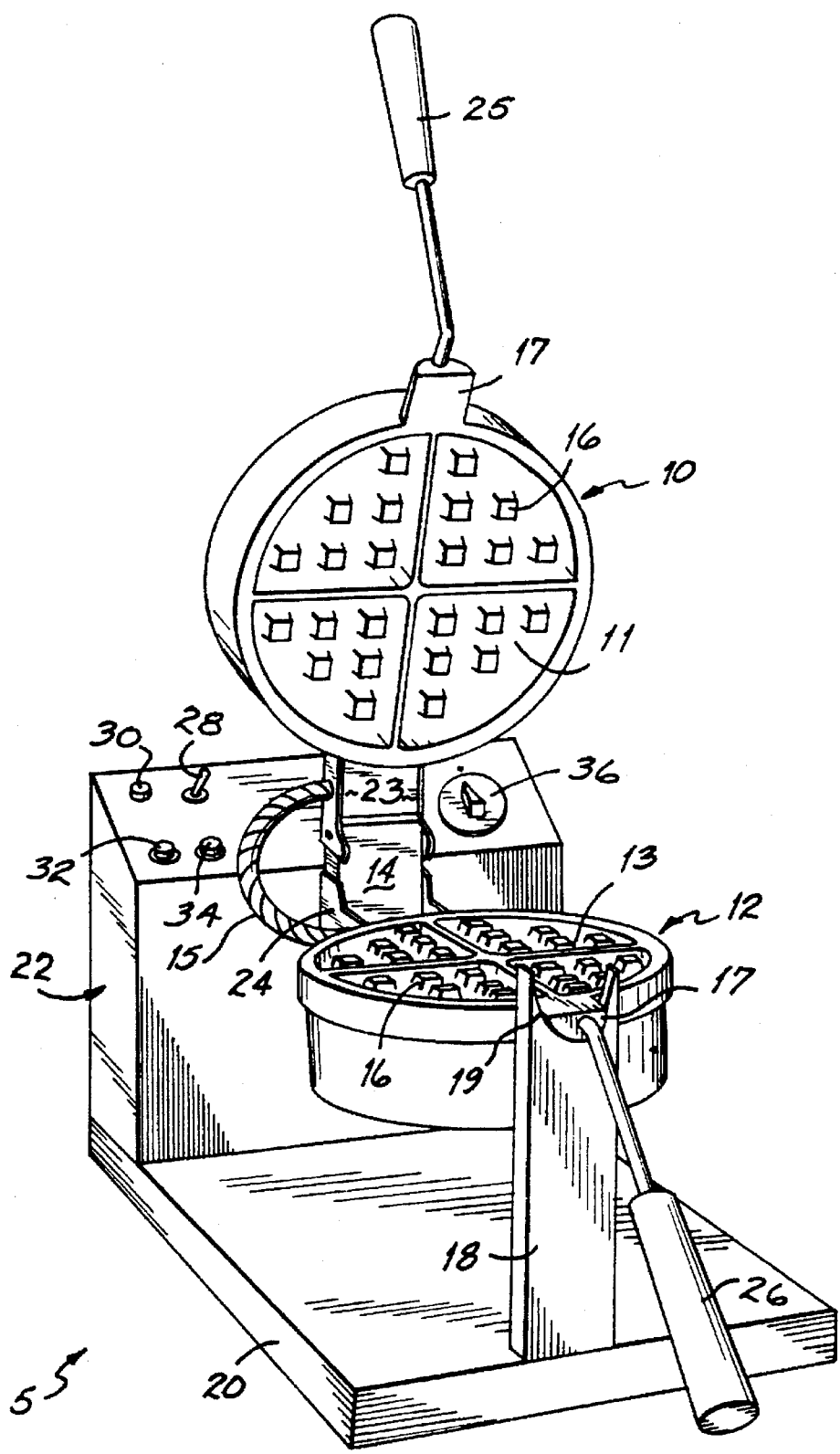
FIG. 1 is a perspective view of a waffle maker incorporating the features of the present invention.

FIG. 1 is a front perspective view of a waffle maker incorporating the features of the present invention. Waffle maker 5 comprises an upper heater grid 10 with a cooking surface 11 and a lower heater grid 12 with a cooking surface 13. The grids 10, 12 are supported by a top support 23 and bottom support 24, respectively, and the supports 23, 24 are coupled together by a rotating bracket 14. The top support 23 is hingedly attached to the rotating bracket 14 and the upper heater grid 10 folds down to meet the lower grid 12 when batter (not shown) is poured onto cooking surface 13. When the upper grid 10 and lower grid 12 are brought together with batter therebetween, the waffle patterns 16 on the heated cooking surfaces 11, 13 cooperate to cook the batter in the form of a waffle (not shown). The heater grids 10, 12, and particularly cooking surfaces 11, 13, are preferably cast aluminum which are heated when a voltage is applied thereto such as through a conductor in conduit 15. The temperature of grids 10, 12 is a function, in part, of the power applied to those grids.

The heater grids 10, 12 have cooperating grid retaining structures 17 which are supported by a front support 18 extending upwardly from a bottom base plate 20 to support the forward ends of grids 10, 12. Bracket 14 is mounted to a control box 22 which is also supported by the bottom base plate 20 to support the rearward ends of grids 10, 12. Rotating bracket 14 is rotatably mounted to control box 22 such that the opposing heater grids 10, 12 may be rotated 180° when the grids are brought together to cook a waffle. The retaining structures 17 are cylindrical for easy rotation of the grids on the front support 18 which has a scooped end 19 to capture the retaining structures. When rotated, the hinged upper grid 10 is located on the bottom and the lower grid 12 is located on the top. The bottom support 24 is stationary on bracket 14 and does not allow the lower heater grid 12 to hinge upwardly, therefore preventing opening of the waffle maker grids when the grids 10, 12 have been rotated 180°. Handles 25, 26 allow for safe handling of the hot grids 10, 12, respectively.

Control box 22 contains the control electronics of the invention as described further hereinbelow. The control box 22 provides mounting support for a toggling ON/OFF switch 28, as well as a pilot light 30 for indicating that the waffle maker 5 is ON. A cooking cycle of the waffle maker 5 is initiated by a momentary START switch 32, and at the end of the cooking cycle, an alarm sounds. The alarm is stopped by a momentary STOP switch 34. The waffle maker 5 has a variable duration cooking and the duration of the cooking cycle is determined by a timer knob 36 which is preferably adjustable between a range of 2–5 minutes.

Figure 2:
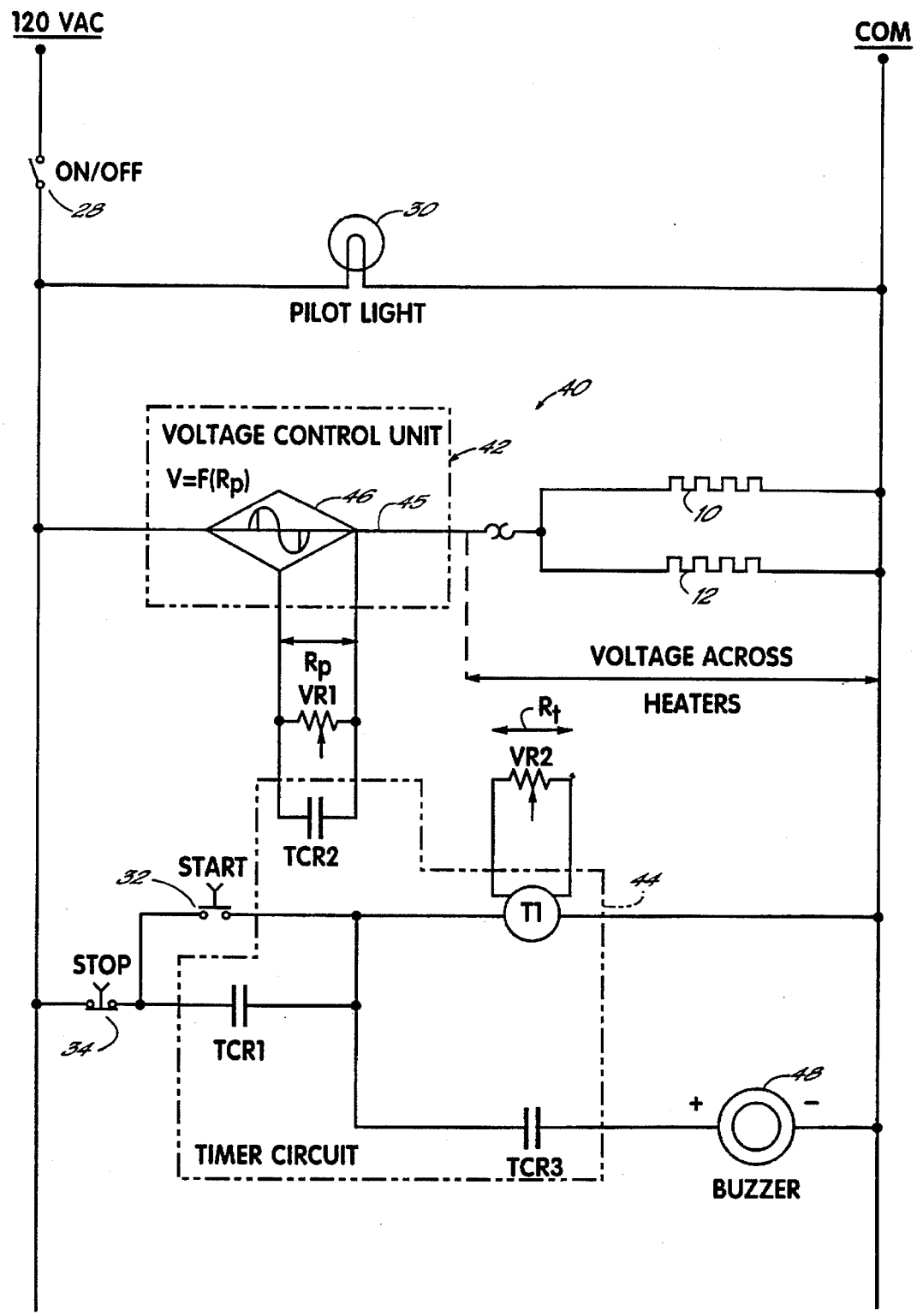
FIG. 2 is a circuit schematic of the controllable power supply of the invention.

FIG. 2 illustrates the control electronics of the present invention which are operated at 120 Volts AC. Closing the ON/OFF switch 28 turns the waffle marker ON and connects the control electronics to an external power source of 120 Volts AC, such as from a socket (not shown). Pilot light 30 is illuminated when waffle maker 5 is turned ON.

The control electronics of the present invention include a controllable power supply 40 which comprises a voltage control unit 42 and a timer circuit 44 coupled to the voltage control unit. The controllable power supply 40 supplies power to the heater grids 10, 12 to heat the grids to cook a waffle. The controllable power supply 40 has a cooking mode wherein a high level output is supplied to grids 10, 12 during a cooking cycle, and a standby mode wherein a lower level output is supplied to the grids upon completion of the cooking cycle. The high level output power of the cooking mode causes the grids 10, 12 to heat up to sufficiently to cook a waffle while the lower level output power of the standby mode maintains the heater grids at a hot temperature for the next waffle but prevents overheating of the grids when the cooked waffle has been removed and there is no uncooked batter between the grids. Uncooked batter acts as a load on the grids 10, 12 absorbing the heat of the grids during cooking, and when the batter is cooked and the waffle removed, the grids of conventional waffle makers usually will heat up beyond a desired operating point. The present invention reduces such overheating.

More specifically, the voltage control unit 42 of the controllable power supply 40 includes a proportional phase controller 46 which produces a variable voltage at the output 45 that is a function of a parallel resistance $R_p$ connected at the output 45. The parallel resistance $R_p$ is provided by a variable resistor VR1 connected in parallel across the output 45 of the proportional phase controller 46. In a preferred embodiment of the invention, the proportional phase controller 46 is a PHS120A10 phase controller manufactured by SSAC, 8220 Loop Road, Baldwinsville, N.Y. 13027. With the phase controller 46 and an $R_p$=0 (i.e. short circuit) the voltage control unit 42 delivers a high level voltage of 120 Volts AC to the heater grids 10, 12. Utilizing the proportional phase controller 46, and adjusting the value of VR1 to yield an $R_p$ equal to approximately 47 k Ohms provides a lower level voltage at the output 45 of approximately 32–35 Volts AC. By changing the effective $R_p$ value at the phase controller 46, the present invention varies the voltage and power delivered to the grids 10, 12 between a high level (cooking mode) and a lower level (standby mode).

During the cooking cycle, VR1 is short circuited by the timer circuit 44 to make $R_p$ equal to 0 Ohms. The voltage control unit 42 then delivers 120 Volts AC to the heater grids 10, 12 to produce a power level of approximately 500 Watts per grid or 1000 Watts for both grids. When the cooking cycle is complete, the short circuit is opened and the effect of VR1 =47 k Ohms again lowers the voltage level at output 45 to approximately 32–35 Volts AC. This results in an effective power level of less than 500 Watts per grid. Therefore, during a cooking cycle, the heater grids 10, 12 are supplied with high level power to provide adequate cooking of the waffle batter. However, when the batter has been cooked and the waffle has been removed, the heater grids 10, 12 are provided with a lower level power so that they still remain heated but do not overheat. Preferably, the grids 10, 12 are constructed and the voltage control unit 42 is operated such that the grid temperature during a cooking cycle is approximately 410° F. when the waffle finishes cooking. A standby temperature between 360° F. to 400° F. and preferably from 402° F. to 410° F., lower power delivery in the standby mode. As will be understood by a person of ordinary skill in the art, the amount of power at the respective output voltage which must be delivered to a heater grid to maintain a desired standby temperature and cooking temperature is dependent upon the size and configuration of the grid as well as its composition and heat dissipating characteristics. If the grid has a larger mass, it may generally require greater power to heat to a desired temperature and therefore the voltage level at the output 45 of voltage control unit 42 may need to be increased (or possibly decreased in the case of a heater grid with less mass). Accordingly, the value of VR1 may be adjusted to vary $R_p$ to provide the desired output level during the standby mode of the waffle maker 5.

Preferably, the timer circuit 44 utilizes a solid-state timer T1 and three solid-state timer controlled relays TCR1, TCR2 and TCR3 to control power supply 40 and operate the waffle maker 5. In a preferred embodiment, the timer is a TGPL 1300 D25 timer available from AIR-O-TRONICS, 2747 Route 20 East, Cazenovia, N.Y. 13035. TCR1 is a latching relay which latches the timer T1 in an ON state when the momentary START switch 32 is momentarily closed to start the cooking cycle. Upon initiating a cooking cycle, T1 then activates relay TCR2 to close the relay and thus form a short circuit across VR1 to make $R_p=0$ Ohms.

Upon cessation of the cooking cycle as determined by T1, TCR2 is opened providing $R_p=47$ k Ohms at the output 45 of the voltage control unit 42 to thereby deliver less power to the grids 10, 12. The effective $R_p=1/(1/VR1+1/TCR2_{open})$. Since the open circuit resistance across TCR2 is infinite and $1/TCR2_{open}=0$, then $R_p=VR1=47$ k Ohms (or whatever value VR1 is adjusted to). The duration of the cooking cycle of T1 is set by varying the resistance $R_t$ of variable resistor VR2. Preferably, the cooking cycle may be varied from approximately two to five minutes. VR2 is part of the timer knob 36 so that the operator sets the cooking cycle duration. Upon opening TCR2 at the completion of the cooking cycle, the timer circuit 44 closes relay TCR3 and provides 120 Volts AC to an audible alarm 48, which is preferably a piezoelectric buzzer. Buzzer 48 then sounds continuously until the momentary STOP switch 34 is thrown open which resets each of TCR1, TCR2 and TCR3 to an open state, (if they are not already in that state) and also resets timer T1. The timer circuit T1 and relays TCR1, TCR2 and TCR3 will also reset whenever the ON/OFF switch 28 is opened.

Waffle maker 5 also comprises a high limit thermostat switch 50 which is utilized as a safeguard should the heater grids 10, 12 exceed a high temperature limit. For example, if TCR2 sticks in a closed state after completion of the cooking cycle, 120 Volts is provided to the heater grids 10, 12 while the grids are not cooking, which may cause them to overheat. Should this occur, the high limit thermostat switch opens to allow the heater grids 10, 12 to cool. Generally, however, the high limit thermostat switch 50 remains closed and will not affect the operation of the circuit.

The controllable power supply 40 of the present invention eliminates the necessity of having a thermostat switch constantly cycle to maintain the proper temperature of the heater grids 10, 12 without overheating the grids. As mentioned, the thermostat switches utilized in conventional units only have a useful operation life of approximately 100,000 cycles, and with constant cycling, the switches only have a useful life of approximately four months. The solid state timer controlled relays TCR1, TCR2 and TCR3 and the timer T1 of the invention, may be cycled at least one million times before requiring replacement. Furthermore, the relays and phase controller are usually only cycled each time a cooking cycle is initiated, therefore allowing for one million or more cooking cycles before requiring maintenance or replacement.

An additional advantage of the waffle maker 5 of the present invention is that it is not subject to environmental fluctuations. Conventional waffle makers which utilize cycling thermostats to control the temperature of the heater grids cycle more rapidly when the outer environment is hot, or when the grids are set to a high temperature, such as to cook refrigerated batter. The present invention is not subject to environmental fluctuations and will generally maintain the heater grids at a proper cooking temperature and a proper standby temperature without overheating regardless of the outside temperature of the environment or the temperature of the batter to be cooked.

Figure 3A:
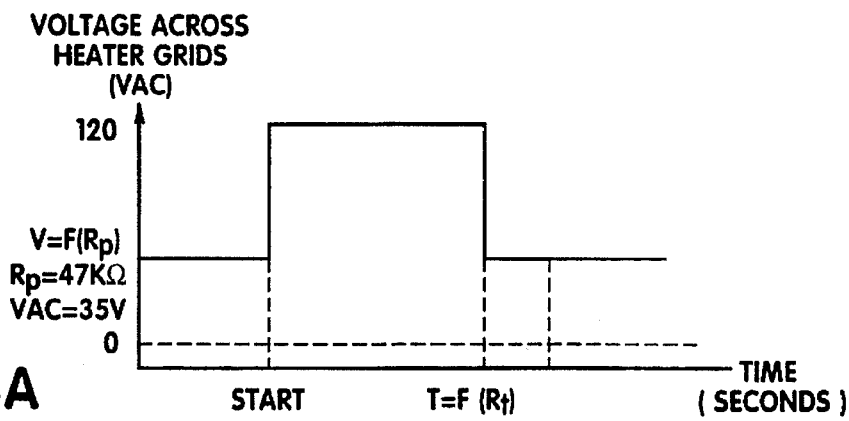
FIGS. 3A, 3B, 3C, 3D and 3E are timing diagrams for the operation of various elements of the controllable power supply of FIG. 2.
Figure 3B:
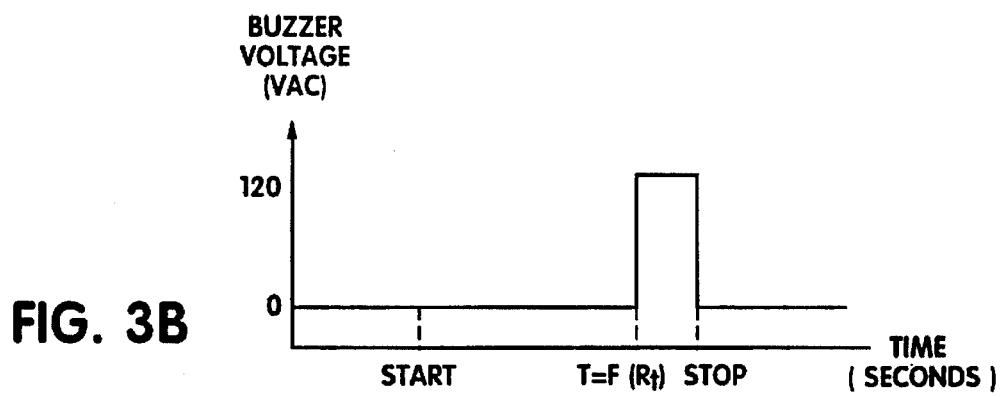
Figure 3C:
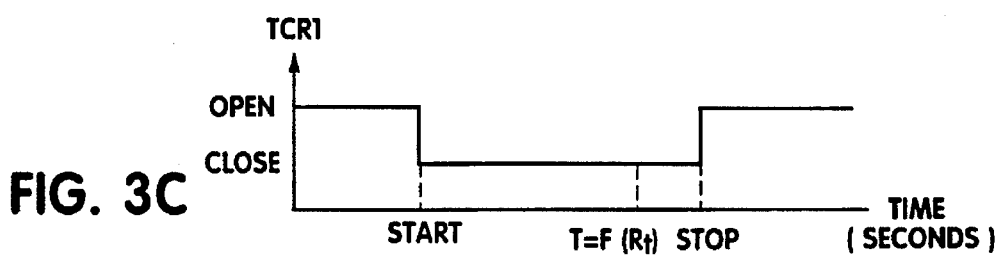
Figure 3D:
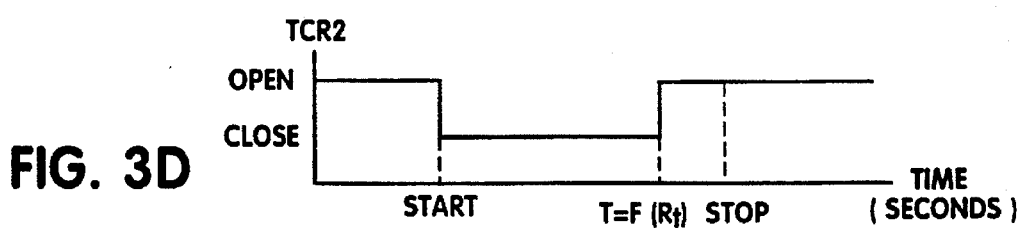
Figure 3E:
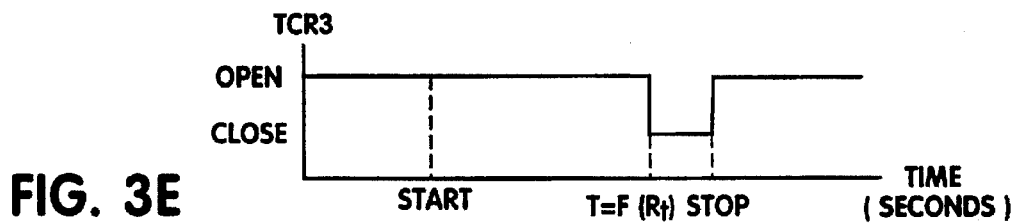

FIGS. 3A, 3B, 3C, 3D and 3E illustrate timing diagrams which are helpful in understanding the operation of the waffle maker 5 of the invention. Referring to FIG. 3A, the voltage across the heater grids 10, 12 is a function of $R_p$. Before the initiation of a cooking cycle from activation of the momentary START switch 32, the controllable power supply 40 is in the standby mode and the voltage delivered to the heater grids 10, 12 at the output 45 of the voltage control unit 42 is approximately 32–35 Volts AC. When the START switch 32 is activated, TCR1 is latched to a closed state (see FIG. 3C) to place timer T1 in an ON state. Subsequently, TCR2 is closed (see FIG. 3D), short circuiting VR1 and raising the grid voltage to 120 Volts AC (see FIG. 3A). The duration of the cooking cycle as determined by T1, is a function of the resistance $R_t$ across VR2. VR2 is coupled to the timer knob 36 and the resistance value of VR2 is adjusted by adjusting the knob. Preferably, the cooking cycle is between 2–5 minutes in duration. Upon the completion of the cooking cycle, TCR2 opens (FIG. 3D) and TCR3 closes (FIG. 3E) to provide 120 Volts AC to a buzzer 48 (FIG. 3B) which causes the buzzer to continuously sound until the STOP switch 34 is activated. Upon activation of the STOP switch 34, TCR3 is opened (FIG. 3E) and the buzzer 48 is turned OFF (FIG. 3B).

Therefore, the waffle maker 5 of the invention cooks waffles reliably and consistently at the proper temperature during a cooking cycle, while maintaining the heater grids 10, 12 in a heated standby state without overheating the grids. The standby mode of the controllable power supply 40 of the invention eliminates the necessity of utilizing a cycling thermostat, which is prone to wearing out from the repeated cycling. Furthermore, the standby mode of the power supply maintains the heater grids 10, 12 in a hot state and reduces the delay in cooking a waffle which is normally required when the waffle maker is turned off between cooking cycles. The waffle maker 5 is not subject to environmentally variations, because the controllable power supply is controlled by a solid-state timing circuitry and not a temperature element such as a thermostat switch.

While the present invention has been illustrated by a description of various embodiments and while these embodiments have been described in considerable detail, it is not the intention of the applicants to restrict or in any way limit the scope of the appended claims to such detail. Accordingly, departures may be made from such details without departing from the spirit or scope of applicant's general inventive concept.

What is claimed is:

1. A waffle maker for making a cooked waffle from batter and comprising:

a pair of opposing heater grids configured to be closed together when batter is placed therebetween for cooking the batter to make a waffle;

a automatically controllable power supply with an output coupled to the grids for supplying power thereto to heat the grids, the power supply operable, in a cooking mode, to automatically supply a high level output to the grids during a cooking cycle for cooking the batter between the grids to make a waffle, and further operable, in a standby mode, to automatically supply a lower level output s to the grids upon completion of the cooking cycle for preventing overheating of the grids when uncooked batter is not between the grids;

whereby the temperature of the grids is controlled to cook batter placed between the grids and when no batter is present, to prevent overheated grids between cooking cycles.

2. The waffle maker of claim 1 wherein the controllable power supply comprises a voltage control unit coupled to the grids for supplying an output voltage thereto to heat the grids and a timer circuit for determining the cooking cycle, the voltage control unit supplying a high output voltage to the grids in response to the timer circuit cooking cycle and supplying a lower output voltage to the grids when the timer circuit completes the cooking cycle.

3. The waffle maker of claim 2 wherein the timer circuit includes a variable resistor for setting the duration of the timer circuit cooking cycle.

4. The waffle maker of claim 2 further comprising a START switch, the timer circuit including a latching switch and a timer, the latching switch closing when the START switch is activated for providing continuous power to the timer to initiate a cooking cycle.

5. The waffle maker of claim 2 further comprising a STOP switch, the timer circuit deactivating when the STOP switch is activated.

6. The waffle make of claim 2 wherein the high output voltage is approximately 120 Volts AC.

7. The waffle make of claim 2 wherein the lower output voltage is approximately in the range of 32–35 Volts AC.

8. The waffle maker of claim 1 wherein the power supply output level is a function of a control resistor coupled to the power supply output, the power supply operable to make a short circuit across the control resistor during the cooking cycle so that the power supply operates at the high level output and further operable to open the short circuit upon the completion of the cooking cycle so that the power supply operates at the lower level output.

9. The waffle maker of claim 8 wherein the controllable power supply further comprises a timed switch coupled in parallel with the control resistor, the timed switch closing during the cooking cycle to short circuit the control resistor and opening upon completion of the cooking cycle so that the power supply operates at the lower level output.

10. The waffle maker of claim 9 wherein the controllable power supply further comprises a timer for determining the cooking cycle and opening and closing said timed switch.

11. The waffle maker of claim 10 further comprising a STOP switch operatively connected to deactivate the timer.

12. The waffle maker of claim 8 wherein the control resistor is a variable resistor for setting said lower level output.

13. The waffle maker of claim 9 wherein the controllable power supply further comprises a variable resistor coupled to said timer which sets the duration of the timer cooking cycle.

14. The waffle maker of claim 1 further comprising an audible alarm, the alarm operable to sound at the completion of the cooking cycle to indicate that the waffle is cooked.

15. The waffle maker of claim 14 further comprising a STOP switch coupled to the audible alarm, the alarm continuously sounding upon the completion of the cooking cycle until the STOP switch is activated.

16. The waffle maker of claim 1 further comprising a thermal switch coupled between the power supply output and the heater grids, the thermal switch opening when the temperature of the grids exceeds a predetermined maximum temperature for stopping the flow of power to the grids.

17. The waffle maker of claim 1 wherein said high level output is approximately 500 Watts per heater grid.

18. The waffle maker of claim 1 wherein said high level output in the cooking mode maintains the grids at a temperature approximately in the range of 400° F. to 420° F. during a cooking cycle to cook the batter.

19. The waffle maker of claim 1 wherein said lower level output in the standby mode maintains the grids at a temperature approximately in the range of 360° F. to 430° F.

20. In a cooker comprising two grids between which batter is placed for cooking and a power supply for heating said grids, the improvements comprising:

a control circuit coupled to the power supply and operable, during a cooking mode, for automatically applying first heating power to said grids to maintain the grids at a first temperature level for cooking batter placed therebetween; and the control circuit further operable, during a standby mode, for automatically applying second heating power to said grids and maintaining said grids at a second temperature level below the first temperature level, the second temperature level being sufficient to cook batter upon introduction of batter to the grids but being below the temperature to which the grids would elevate when said first heating power is applied thereto with no batter placed between the grids.

* * * * *

UNITED STATES PATENT AND TRADEMARK OFFICE
CERTIFICATE OF CORRECTION

PATENT NO. : 5,636,564
DATED : June 10, 1997
INVENTOR(S) : Ronald R. Weiss

It is certified that error appears in the above-indentified patent and that said Letters Patent is hereby corrected as shown below:

In Column 5, line 50, delete "marker" and insert --maker--.

In Column 5, line 64, delete the word "to" after --up--.

In Column 6, line 47, insert "is maintained during" after --410°F--.

In Column 8, line 59, delete "s" after the word --output--.

In Column 9, line 18, delete "make" and insert --maker--.

In Column 9, line 20, delete "make" and insert --maker--.

Signed and Sealed this

Fourteenth Day of October, 1997

BRUCE LEHMAN

*Attest:*

*Attesting Officer*  *Commissioner of Patents and Trademarks*